United States Patent [19]

Strathmann

[11] 4,071,590

[45] Jan. 31, 1978

[54] COMPOSITE ASYMMETRICAL MEMBRANES

[75] Inventor: Heinrich Strathmann, Tubingen, Germany

[73] Assignee: Forschungsinstitute Bergof GmbH, Turbingen, Germany

[21] Appl. No.: 627,684

[22] Filed: Oct. 31, 1975

[30] Foreign Application Priority Data

Nov. 2, 1974 Germany .............................. 2452026

[51] Int. Cl.² ............................................. B01D 39/04
[52] U.S. Cl. ...................................... 264/45.1; 264/41; 260/78 TF; 210/500 M
[58] Field of Search ............... 264/41, 49; 260/78 TF; 210/500 M, 490, 321 R

[56] References Cited

U.S. PATENT DOCUMENTS

| | | | |
|---|---|---|---|
| 3,724,672 | 4/1973 | Leonard et al. ................. | 210/500 M |
| 3,816,303 | 6/1974 | Wrasidlo ......................... | 210/500 M |
| 3,878,109 | 4/1975 | Ikeda et al. ...................... | 210/500 M |
| 3,925,211 | 12/1975 | Schumann et al. ............. | 210/500 M |

*Primary Examiner*—Frank A. Spear, Jr.
*Assistant Examiner*—Ethel R. Cross
*Attorney, Agent, or Firm*—Robert A. Cesari; John F. McKenna; Andrew F. Kehoe

[57] ABSTRACT

Novel composite asymmetrical membranes, comprising a support membrane and a filtration membrane, and process for making the same. The novel membranes are formed by making a sequence of two-stage membranes, one formed upon the other. The process makes possible the formation of both a support membrane and filtration membrane from the same material rather than, as was necessary in the prior art, formation of a filtration membrane only from a different polymer soluble in solvent media which would have no substantial effect on the support membrane.

4 Claims, No Drawings

COMPOSITE ASYMMETRICAL MEMBRANES

BACKGROUND OF THE INVENTION

This invention relates to composite asymmetrical membranes which are manufactured from polymers in such a way that an extremely thin film is applied as filtration membrane onto a porous supporting membrane.

For some years, the membrane filtration, which is well-known as ultrafiltration and reversed osmosis, has become more and more important for the selective separation of fluid particles from a liquid containing a plurality of components, for example a solution.

When a solution is brought to the surface of the filtration membrane, the solvent and a part of the dissolved substances in the solution are retained at the surface of the membrane. The filtration of solutions of macromolecular substances in which the high molecular particles are retained is called "ultrafiltration," while the filtration of solutions of low molecular substances in which the low molecular particles are retained is called "reversed osmosis."

In the field of sea water and brackish water desalting, for the removal of contaminations from water and for other purposes, the reversed osmosis has more and more proved to be a simple and economical process. The degree of efficiency of the reversed osmosis decisively depends on the filtration efficiency and the retaining capacity of the membranes used, but also on their stability and durability.

Up to now, so-called integral-asymmetrical membranes have been used almost exclusively, which membranes are manufactured according to a method used for the first time by S. Loeb and S. Sourirajan (Advan. Chem. Ser. 38, 117 (1963)) by precipitation from a solution containing the polymer membrane material. An extremely thin polymer film is thus formed on a highly porous substructure which serves as supporting material for the film having a thickness of approx. 1/um. As the filtration efficiency is inversely proportional to the film thickness, attempts have been made to prepare films that are even thinner. Hence, there have been developed composite asymmetrical membranes, so-called "composite membranes," which are manufactured in such a way that an extremely thin film is applied as filtration membrane onto a porous supporting membrane only subsequently. These composite membranes were described by Riley, R.L., H.K. Lonsdale, L.D. LaGrange and C.R. Lyons in Office of Saline Water R. & D. Report No. 386, 1968. Such films have a thickness of about 500 A only and, therefore, they have a considerably higher filtrate flow than the comparatively thick integral-asymmetrical membranes, the retaining capacity being the same.

Said process for the manufacture of composite membranes, however, is limited to the use of such materials the solvent of which does not attack the porous supporting membrane. It is necessary either to find a supporting membrane that is not dissolved by the solvent in which the material of the filtration membrane is dissolved, or — with a given supporting membrane — only such polymers can be used for the filtration membrane the solvent of which does not influence the supporting membrane. As a result, the number of starting materials, in particular the number of polymers, having a high chemical and thermal stability is considerably reduced. The operational possibilities of the composite membranes are reduced to such conditions, for example pH-value and temperature, that are compatible with the material of the filtration membrane and of the supporting membrane. The diverse mechanical properties of filtration membrane and supporting membrane may also have a detrimental effect. When masking the supporting membrane with a substance which is insoluble in the solvent of the filtration membrane but is eliminated with water after the filtration membrane has been applied (cf., inter alia, H.K. Lonsdale, R.L. Riley, L.D. LaGrange, C.R. Lyons, A.S. Douglas, U. Merten, Office of Saline Water R. & D. Report No. 484, 1969), it is necessary to find substances that are soluble in water but insoluble in the solvent of the filtration membrane, whereby the number of polymers suitable for the filtration membrane is again reduced.

Commonly-owned and co-pending U.S. Pat. application Ser. No. 458,483 now U.S. Pat. No. 3,925,211 discloses a two-stage-reaction, membrane-forming process which applicants have utilized in forming novel composite membranes as discussed below.

SUMMARY OF THE INVENTION

It is the object of the present invention to provide composite asymmetrical membranes which are composed in such a way that the disadvantages described above are avoided.

This object has been achieved in accordance with the invention by manufacturing the supporting membrane and the filtration membrane of the composite asymmetrical membrane from the same polymer material.

The manufacture of composite asymmetrical membranes with both membrane parts consisting of the same polymer material is carried out in accordance with the invention in such a manner that first an asymmetrical porous supporting membrane is prepared from a soluble polymer, for example from a polyamide dissolved in a suitable solvent, which is then converted by heating or by a cyclisation reaction into an asymmetrical polyimide membrane now insoluble in the solvent use, whereby it becomes insoluble in the solvent of the filtration membrane consisting of the same polymer so that it becomes possible to apply the filtration membrane which is then converted into the insoluble polyimide form in the same manner as the supporting membrane.

Hence, the composite asymmetrical membranes of the invention are manufactured in such a way that the supporting membrane and the filtration membrane are prepared from a so-called two-stage polymer, the soluble first stage of which serves to prepare the supporting membrane according to the well-known process for the formation of asymmetrical membranes, and, after the supporting membrane has been converted into the insoluble second stage, the filtration membrane which has been prepared from the soluble first stage of the polymer is then applied onto the supporting membrane, the filtration membrane being likewise converted into the second stage after having been applied onto the supporting membrane.

Suitable for this method of manufacturing the novel composite membranes are polymers of high resistance to chemical and thermal strain, for example the polyamides, or the polyimides as representatives of the class of two-stage polymers, or the polybenzimidazoles and polybenzpyrrolidones. As compared to the known composite membranes consisting of two different membrane materials, composite membranes with supporting membrane and filtration membrane consisting of the same polymer as specified above, have the advantage of higher chemical, thermal and mechanical stability and thus a much wider field of application, for example also in the filtration of agressive media or of strongly acidic or basic solutions. On account of these properties, the new membranes have a considerably longer working life, all the more so as the mechanical stability cannot be impaired by diverse mechanical properties of filtration membrane and supporting membrane.

The concentration of film-forming organic compounds in the solution from which the top membrane, i.e. the tighter reverse osmosis membrane, is formed should be within the range of about 0.5 to about 5 percent by weight. This is coated over the support membrane to yield a filtration membrane of up to about 600 A. Such membranes normally will be at least about 200 A in thickness.

The process of the invention for the manufacture of composite membranes is not limited to the formation of composite film membranes, but it may also be used for the manufacture of composite hollow fibre membranes having an inner or outer separating layer, and of composite tube membranes, which comprises, in accordance with the invention, converting the hollow fibre or tube membranes prepared from suitable two-stage polymers into insoluble supporting membranes onto the inner or outer surfaces of which thin films of the same polymer material are applied as filtration membranes, for example by pumping a dilute solution of the soluble first stage of the polymer material through the hollow fibre membrane or tube membrane prepared from the same polymer, whereupon the solvent is evaporated and a filtration membrane is thus formed inside the hollow fibre or tube membrane in the form of the insoluble second stage of the polymer material.

According to the known precipitation process, an integral-asymmetrical supporting membrane of predetermined pore size and pore size distribution is prepared from a solution of the first stage of a two-stage polymer. By dehydration, for example, by heating or by a chemical reaction, the polymer material of said supporting membrane is converted into the insoluble second stage of the two-stage polymer.

The following six Examples 1-S through 7-S serve to illustrate the preparation of various polyimide membranes useful as support membranes. The following Examples are carried out according to well-known manipulative procedures preferably in the absence of oxygen at a temperature sufficiently low to allow formation of a film-forming prepolymer.

EXAMPLE 1-S 9.2 g of benzidine are dissolved in 170 g of anhydrous N-methylpyrrolidone in the absence of air and moisture. The solution is cooled to 5°–10° C and 10.9 g of pyromellitic anhydride are added in portions. The resulting solution is stirred for 12 hours at 15°–10° C and, subsequently, the viscous solution is pressure filtered and then centrifuged. The clear yellowish and viscous solution obtained is spread out on a glass plate to form a 0.3 mm thick film and put into acetone at 10° C. After 1 minute, the plate is removed and placed in a solution consisting of 4 g of N,N′-dicyclohexylcarbodiimide in 400 ml of anhydrous acetone for 24 hours. Thereupon, the asymmetric polyimide membrane thus formed is placed for several hours in ethanol at room temperature. The alcohol is changed several times and then slowly diluted with water. Finally, the membrane is placed in pure water.

EXAMPLE 2-S 9.2 g of benzidine are dissolved in 170 g of anhydrous N-methylpyrrolidone in the absence of air and moisture. The solution is cooled to 5° – 10° C and a total of 10.9 g of pyromellitic anhydride are added in portions. After the addition has been completed, the whole is stirred for 12 hours. The resulting highly viscous solution is pressure filtered and then centrifuged. This solution is spread into a thin film on a glass plate and immersed in acetone. The resulting membrane is then placed into a mixture of benzene : pyridine : acetic anhydride ( 2 : 2 :1 ) where it is left for 24 hours. Subsequently, the membrane is quickly dipped into acetic acid and then placed in ethanol for 1 hour. The membrane is then dried well and heated to 300° C for 15 minutes.

EXAMPLE 3 - S 5 g of 4-aminophthalandione acetate are dissolved in 7 g of anhydrous pyridine in the absence of air and moisture and this solution is stirred for 24 hours at 50° C. Thereupon, it is pressure filtered and centrifuged. The viscous solution is spread into a thin film on a glass plate and immersed in acetone. The resulting membrane is then placed in a solution of 4 g of N,N′-dicyclohexylcarbodiimide in 400 ml of anhydrous acetone for 24 hours. Subsequently, the acetone solution is replaced by ethanol. After 24 hours, the membrane is placed in pure water.

EXAMPLE 4-S 3 g of 4-aminophthalandione are dissolved in 5 g of dimethylacetamide in the absence of air and moisture and stirred for 24 hours at 70° C. The resulting viscous solution is pressure filtered and centrifuged. The solution is spread into a thin film on a glass plate and immersed in acetone. The membrane thus formed is placed in a mixture of benzene : pyridine : acetic anhydride ( 2 : 2 : 1 ) for 24 hours. Subsequently, it is dipped quickly into acetic acid and then placed for 1 hour in ethanol. The membrane is then dried and then heated for 15 minutes at 300° C.

The following reaction scheme illustrates the course of the reaction described in Examples 3 and 4:

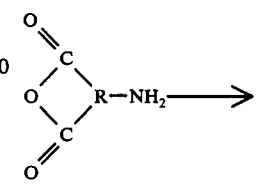

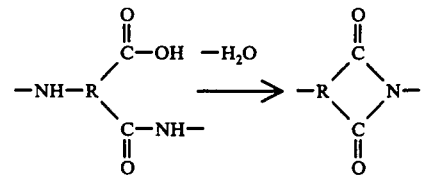

EXAMPLE 5-S 9.2 g of benzidine are dissolved in 170 ml of anhydrous dimethylacetamide in the absence of air and moisture. The solution is cooled to 5° – 10° C and a total of 10.9 g of pyromellitic anhydride is added in portions. After the addition has been completed, the solution is stirred for 12 hours and then pressure filtered and centrifuged. The viscous solution is spread into a thin film on a glass plate and then immersed into acetone. The resulting membrane is then placed for 24 hours in a solution of 2.6 g of imidazole and 1 g of triphenyl phosphate in 20 ml of triethylamine at 40° C. Finally the membrane is dipped quickly in acetic acid and then stored in water.

EXAMPLE 6-S 4.6 g of benzidine are dissolved in 80 ml of dimethylacetamide in the absence of air and moisture and then 10.9 g of pyromellitic anhydride are added in portions at 5° – 10° C, Subsequently the solution is stirred for 12 hours. It is then pressure filtered and centrifuged. A thin film is spread onto a glass plate which is then immersed in a solution of nicotinic acid anhydride in acetone for 24 hours at 35° C. Thereupon, the membrane is placed for several hours in ethanol and then in water.

EXAMPLE 7 - S 9.2 g of benzidine are dissolved in 150 ml of anhydrous dimethylacetamide in the absence of air and moisture. A total of 10.9 g of pyromellitic anhydride is then added portionwise while the temperature is maintained at 5° – 10° C. After the addition has been completed, the mixture is stirred for 12 hours and then pressure filtered and centrifuged. The viscous solution is spread into a thin film on a glass plate which is then immersed in acetone. The resulting membrane is placed in a solution of phosphorous dichloronitride trimer in heptane for 24 hours at 50° C and subsequently for several hours in ethanol and then in water.

EXAMPLE 2-C

According to the known precipitation process, an integral-asymmetrical membrane having the desired pore size and pore size distribution is prepared from the solution of a polyamide, for example an acid amide from a tetracarboxylic acid dianhydride and a diamine as has been taught in Examples 1-S through 7-S. By means of a thermal after-treatment at a temperature suitable for the respective polyamide, the polymer is transformed into the polyamide stage where it is no longer soluble in the solvent used for the preparation of the membrane. A dilute (3%) polyamide solution of the initially used to form the support membrane (but in which the polymer material of the supporting membrane treated as described above is no longer soluble is applied in a thin coating onto the surface of said supporting membrane. The coating is selected to yield a 400 angstrom filtration membrane. By evaporation of the solvent, the filtration membrane, is also converted into the insoluble stage, on the supporting membrane.

EXAMPLE 3-C

Using known chemistry and the manipulative steps disclosed above, a composite polybenzimidazole membrane is formed with the filtration membrane having a 400 angstrom thickness, the support membrane being about 0.001 inch in thickness.

EXAMPLE 4-C

Using known chemistry and the manipulative steps disclosed above, a composite polybenzpyrrolidone membrane is formed with the filtration membrane having a 450 angstrom thickness, the support membrane being about 0.001 inch in thickness.

The filtration characteristics of some polyimide membranes are listed in the following Table:

Filtration characteristics of some asymmetric polyimide membranes suitable for the desalination of water

| Polymer | Solvent | Precipitation bath | Cyclization to imide | Flux in cm/sec at 100 atm. | $R_{Mg^{2+}}$ % | $R_{Cl^-}$ % |
|---|---|---|---|---|---|---|
| PSA + Benz. 14 % | NMP | Acetone 0° C | Ac. + CDI | $1 \times 10^{-5}$ | 99 | 99 |
| " | NMP | 2.5' Ac. 0° | " | $4 \times 10^{-5}$ | 99 | 99 |
| " | NMP | 5' Ac. 0° | " | $4 \times 10^{-5}$ | 99 | 99 |
| " | DMAc | 1' Ac.20° | " | $19 \times 10^{-5}$ | 99 | — |
| " 10.5 % | NMP | 1' Ac.10° | " | $10 \times 10^{-5}$ | 99 | 99 |

PSA = pyromellitic anhydride
Benz. = benzidine
NMP = N-methylpyrrolidone
DMAc = dimethylacetamide
Ac. = acetone
CDI = N,N'-dicyclohexylcarbodiimide The following Examples serve to illustrate the manufacture of composite membranes according to the invention.

EXAMPLE 1-C

A dilute solution (15%) of the first stage solution of the two-stage polymer is applied onto the surface of each membrane listed in the preceding table supporting membrane disclosed above. The solution is otherwise the same as used to form the support membrane.

The thickness of the coating is chosen so that, by evaporation of the solvent, and ultra thin filtration membrane about 300 angstroms is formed on the supporting membrane by dehydration and conversion into the second stage of the two-stage polymer.

What is claimed is:

1. Process for the manufacture of composite asymmetrical membranes in the form of film, hollow fibre or tube membranes from polymers, by applying a thin film as filtration membrane onto a porous supporting membrane, characterized in that the supporting membrane and the filtration membrane of the composite asymmetrical membrane are prepared from the same polymer material and in such a way that from a solution of the first stage of a two-stage polymer, there is prepared an integral-asymmetrical porous supporting membrane which is then converted into the insoluble second stage of the two-stage polymer by means of a thermal or chemical cyclisation reaction, whereupon a solution of the first stage of the two-stage polymer is applied onto the surface of the supporting membrane thus formed, and the solvent is then evaporated, the filtration membrane being thus formed by conversion of the polymer into the insoluble second stage.

2. Process according to claim 1, characterized in that the two-stage polymer used for the formation of the porous supporting membrane and the filtration membrane is a soluble polyamide which is converted during the process by means of a thermal or chemical cyclisation reaction into an insoluble polyimide.

3. A process as defined in claim 2 wherein said filtration membrane is formed to be less than 500 angstroms in thickness.

4. A process as defined in claim 2 wherein said filtration membrane is formed to be 200 to 600 angstroms in thickness.

* * * * *

UNITED STATES PATENT OFFICE
CERTIFICATE OF CORRECTION

Patent No. 4,071,590      Dated January 31, 1978

Inventor(s) Heinrich Strathmann

It is certified that error appears in the above-identified patent and that said Letters Patent are hereby corrected as shown below:

Col. 6, line 40 (In Table): change "$R_{Cl\_}$" to -- $R_{Cl}^{-}$ --

Col. 6, line 61: delete "and"

Signed and Sealed this

Fourth Day of July 1978

[SEAL]

Attest:

RUTH C. MASON
*Attesting Officer*

DONALD W. BANNER
*Commissioner of Patents and Trademarks*